No. 653,457. Patented July 10, 1900.
A. S. NEWTON.
SANITARY TRAP.
(Application filed Mar. 1, 1900.)
(No Model.)

WITNESSES:
Chas. H. Luther Jr.
A. E. Hagerty.

INVENTOR:
Albert S. Newton
by Joseph H. Miller & Co.
Attys

UNITED STATES PATENT OFFICE.

ALBERT S. NEWTON, OF PROVIDENCE, RHODE ISLAND.

SANITARY TRAP.

SPECIFICATION forming part of Letters Patent No. 653,457, dated July 10, 1900.

Application filed March 1, 1900. Serial No. 6,897. (No model.)

*To all whom it may concern:*

Be it known that I, ALBERT S. NEWTON, a citizen of the United States, residing at Providence, in the county of Providence and State of Rhode Island, have invented a new and useful Improvement in Sanitary Traps, of which the following is a specification.

In sewer and other sanitary traps the water flowing from the trap into the discharge-pipe is liable to form a siphon and by diminishing the pressure in the discharge side of the trap draw the water from the trap. Impurities are also liable to accumulate in such traps and in time prevent the passage of the waste water.

One object of this invention is to retain sufficient water in the trap when siphoned to insure a reliable water seal and to break the siphon by facilitating the passage of air through the trap.

Another object of this invention is to direct the passage of the water through the trap, so that the interior surfaces of the trap are swept by the currents of water to carry off the impurities.

To these ends the invention consists in the peculiar and novel construction whereby a large quantity of water is retained in the trap, the passage of the air facilitated, and the water made to flow over the interior surfaces of the trap, as will be more fully set forth hereinafter.

Figure 1:
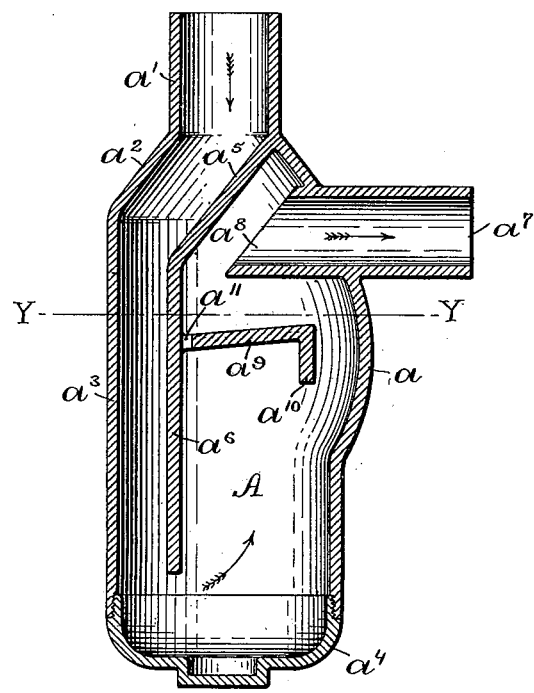
Figure 2:
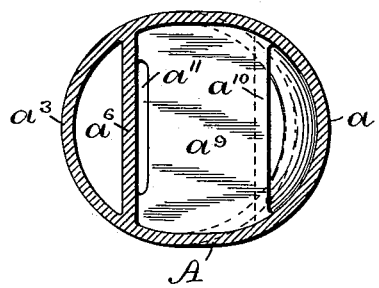

Figure 1 is a vertical sectional view of my improved trap. Fig. 2 is a horizontal sectional view of the same, taken on the line Y Y of Fig. 1.

In the drawings, A indicates the body of the trap, which is of oval cross-section on the line Y Y of Fig. 1 owing to the swell $a$ on the outlet side of the trap, the rest of the trap being of practically-cylindrical cross-section, as is indicated in broken lines in Fig. 2. The neck $a'$, adapted to be secured to the waste-pipe, forms the inlet to the trap. The truncated conical portion $a^2$ connects the neck $a'$ with the main body $a^3$. The cap $a^4$, secured by screw-thread engagement to the body $a^3$, forms the bottom of the trap. The partition $a^5$ extends obliquely from the wall of the outlet side of the trap and connecting with the vertical partition divides the downwardly-extending inlet-passage from the upwardly-extending outlet-passage of the trap. The partition $a^6$ extends nearly to the bottom of the trap. The outlet-duct $a^7$, adapted to be secured to the waste-pipe, extends horizontally outward from the body of the trap. Its walls also extend inward and terminate in the oblique end $a^8$, practically parallel with the oblique partition $a^5$. The baffle-plate $a^9$ extends in practically a horizontal direction from the partition $a^6$, near the vertical center of the swell $a$, and is provided with the downwardly-extending lip $a^{10}$. An air-passage $a^{11}$, consisting in the preferred form of an elongated opening, is formed in the plate $a^9$ at or near the partition $a^6$.

In the preferred form the plate $a^9$, which extends from wall to wall, as is shown in Fig. 2, is placed in the slightly-inclined position shown in Fig. 1.

In the operation of my improved sanitary trap, which is normally filled with water up or nearly up to the outlet-duct $a^7$, when the water of a basin or tub is discharged the water from the basin or tub enters with considerable velocity the neck $a'$ of the trap and down the inlet-passage, causing the trap to overflow into the waste-pipe. The water descending in the waste-pipe reacts on the water in the trap and greatly increases the velocity with which the water flows through the trap. The water rushes down the inlet-passage under the lower end of the partition $a^6$, across the inside of the cap $a^4$, forming the bottom of the trap, then upward over the inner surface of the trap, guided by the baffle-plate $a^9$ around the inwardly-projecting portion of the outlet-duct, and passes out of the trap through the beveled end of the outlet-duct $a^7$. By thus directing the currents of the water over the surfaces and particularly over the bottom of the trap the trap is automatically cleaned at each discharge of any considerable body of water.

To retain a sufficient quantity of water in the trap to form an efficient seal, it is essential that the siphon be broken at the earliest possible moment and before all the water has passed through the trap or the water in the trap has been drawn off by the siphon. To secure this end, the baffle-plate $a^9$, with the lip $a^{10}$, is placed across the greater portion of the internal area of the trap below the outlet-duct to retain the largest possible quantity of water, and the opening $a^{11}$ is made in the plate $a^9$ close to the partition $a^6$, so that as soon as the inflow of water diminishes and air enters the trap the air passing under the partition $a^6$ may pass upward through the opening $a^{11}$ to break the siphon.

The water retained in the trap by means of the baffle-plate and the inward projection of the outlet-duct collects in the bottom of the trap and forms an efficient water seal. The inwardly-projecting outlet-duct, with its oblique end $a^8$, materially assists in the early breaking of the siphon, as the entrance of air to the upper part of the duct is thereby facilitated.

Having thus described my invention, I claim as new and desire to secure by Letters Patent—

1. A trap having the interior divided by a partition into a downward water-passage of less than half the interior of the trap, an upward water-passage of more than half the sectional area, an inlet-duct, an outlet-duct the walls of which extend into the upward water-passage, and a baffle-plate extending from the partition across the greater part of the upward water-passage, as described.

2. In a sanitary trap, the combination with the body A of the trap having the swell $a$, the detachable cap $a^4$, the neck $a'$, the inwardly-extending end $a^8$ of the outlet-duct, and the outlet-duct $a^7$, of the partition $a^5$ extending obliquely from the outlet side of the body of the trap, the partition $a^6$ extending from the partition $a^5$ to near the bottom and forming the inlet-duct of the trap, the baffle-plate $a^9$, the lip $a^{10}$, and the opening $a^{11}$ in the baffle-plate, as described.

3. In a sanitary trap, the combination with the neck $a'$, the conical portion $a^2$ of the trap-body, and the partition, dividing the trap, having the inclined upper portion $a^5$, of the outlet-duct $a^7$ the walls of which extend into the interior of the trap, terminating in the oblique end $a^8$ parallel with the partition $a^5$, as described.

In testimony whereof I have signed my name to this specification in the presence of two subscribing witnesses.

ALBERT S. NEWTON.

Witnesses:
J. A. MILLER, Jr.,
B. M. SIMMS.